(12) United States Patent
Ooyabu

(10) Patent No.: US 8,676,448 B2
(45) Date of Patent: Mar. 18, 2014

(54) OCCUPANT PROTECTION DEVICE

(71) Applicant: Denso Corporation, Kariya (JP)

(72) Inventor: Shinji Ooyabu, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/897,498

(22) Filed: May 20, 2013

(65) Prior Publication Data

US 2013/0317701 A1   Nov. 28, 2013

(30) Foreign Application Priority Data

May 23, 2012  (JP) ................. 2012-117629

(51) Int. Cl.
  *G06F 7/00*  (2006.01)
  *B60R 21/017*  (2006.01)
  *B60R 21/00*  (2006.01)
  *B60R 21/01*  (2006.01)
  *B60R 21/02*  (2006.01)

(52) U.S. Cl.
  CPC ............ *B60R 21/0176* (2013.01); *B60R 21/00* (2013.01); *B60R 21/01* (2013.01); *B60R 21/02* (2013.01)
  USPC .... 701/45; 102/202.1; 102/202.4; 102/202.7; 102/202.9; 102/202.14; 280/728.1; 280/730.2; 280/739; 280/742; 180/202; 180/271; 180/274; 180/282; 340/436; 137/68.13; 361/248; 307/10.1

(58) Field of Classification Search
  CPC .... B60R 21/0176; B60R 21/00; B60R 21/01; B60R 21/02
  USPC ......... 701/45; 102/202.1, 202.4, 202.14, 531; 280/34, 728.1, 730.2, 435, 736, 737, 280/741, 739, 742; 180/274, 282; 340/436; 361/248; 307/10.1; 222/3
  See application file for complete search history.

(56) References Cited

U.S. PATENT DOCUMENTS

| | | | |
|---|---|---|---|
| 6,997,474 B2 * | 2/2006 | Midorikawa et al. | 280/735 |
| 7,162,342 B2 * | 1/2007 | Ishida | 701/45 |
| 2006/0000948 A1 | 1/2006 | Ooyabu | |
| 2007/0096447 A1 * | 5/2007 | Tabe | 280/735 |
| 2007/0290535 A1 * | 12/2007 | Meredith et al. | 297/217.1 |
| 2008/0129475 A1 * | 6/2008 | Breed et al. | 340/438 |
| 2012/0126519 A1 * | 5/2012 | Ohara et al. | 280/735 |

FOREIGN PATENT DOCUMENTS

JP      2006-015807       1/2006

* cited by examiner

*Primary Examiner* — McDieunel Marc
(74) *Attorney, Agent, or Firm* — Harness, Dickey & Pierce, PLC

(57) ABSTRACT

An occupant protection device includes (i) an electronic control unit having a control board, (ii) a parallel connection bus having two lines, (iii) multiple satellite sensors connected to the parallel connection bus, (iv) a squib connected to the parallel connection bus, and (v) an accident prevention diode located close to the squib. The control board includes an interface and a processor. Each of the satellite sensors includes a distributed system interface which is located between the two lines. The parallel connection bus is supplied with a sensor drive voltage. The electronic control unit starts to operate at least one of the occupant protection portions based on a result of the collision determination by the control board.

8 Claims, 7 Drawing Sheets

OCCUPANT PROTECTION DEVICE

CROSS REFERENCE TO RELATED APPLICATION

This application is based on Japanese Patent Application No. 2012-117629 filed on May 23, 2012, the disclosure of which is incorporated herein by reference.

TECHNICAL FIELD

The present disclosure relates to a device protecting an occupant from an impact during a crash or the like in a vehicle such as a car, an aircraft, a vessel or the like. The present disclosure, for example, can be applied to an occupant protection device including an airbag system for a car.

BACKGROUND

In a technical field of such an occupant protection device, a signal line or a communication bus is usually arranged separately from an ignition voltage line. The signal line or the communication bus is used by an electronic control unit (ECU) to receive a signal from a sensor detecting a collision. The ignition voltage line is connected to a squib which ignites an inflator of an airbag and inflates the airbag.

In the JP-A-2006-015807 corresponding to US/20060000948A, for example, although a circuit configuration for an ECU to ignite a squib is disclosed, a description about a sensor system is omitted. Therefore, it is inferable that a signal line by which the ECU receives a signal from a sensor is separately located or that a collision detection sensor or the like is included in the ECU.

The inventor of the present disclosure has found the following. In the occupant protection device such as the airbag, since a signal line and an ignition voltage line are arranged separately, the configuration requires more man hours and results in a heavier and larger device due to the line.

SUMMARY

It is an object of the present disclosure to provide an occupant protection device which has a simplified line to enable to be downsized and lightweight.

An occupant protection device includes (i) an electronic control unit including a control board, (ii) a parallel connection bus having two lines, (iii) multiple satellite sensors connected to the parallel connection bus for collision detection, (iv) a squib connected to the parallel connection bus, and (v) an accident prevention diode located in the vicinity of the squib. The control board includes an interface which has a communication circuit to conduct a power line superposed communication, and a processor which is connected to the interface and configured to make a collision determination. A base portion of the parallel connection bus is connected to the electronic control unit and the parallel connection bus is supplied with a sensor drive voltage. Multiple satellite sensors are connected to the parallel connection bus. A distributed system interface is included in each of the satellite sensor. The satellite sensor is located between the two lines of the parallel connection bus. The squib is configured to start to operate at least one of occupant protection portions by an ignition voltage which is reverse polarity to the sensor drive voltage. The accident prevention diode is connected in series with the reverse polarity to the sensor drive voltage. The electronic control unit starts to operate at least one of the occupant protection portions based on a result of a determination by the control board. The electronic control unit includes ignition switching elements which apply the ignition voltage for the squib through the parallel connection bus.

According to the above occupant protection device, it enables to provide an occupant protection device which has a more simplified line to enable to be downsized and lightweight is provided.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The inventor of the present disclosure has found the following.

In recent years, so that an ECU can make a determination of a collision quickly and surely in a collision accident of a vehicle such as a car or the like, many kinds of sensors tend to be used. The sensors may be an impact angular velocity sensor and a pressure sensor which detects a pressure change within a door panel.

Figure 7:
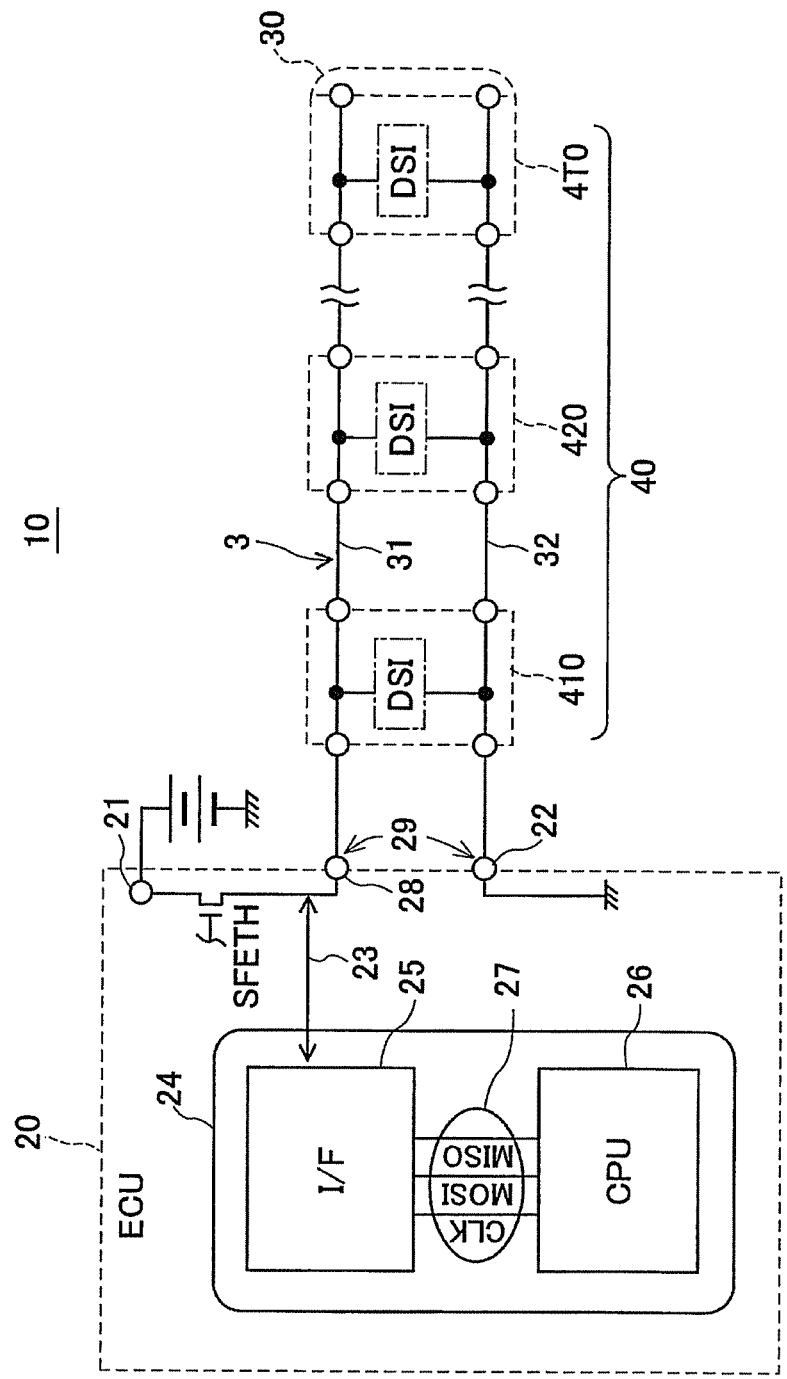
FIG. 7 is a circuit diagram illustrating a structure of an occupant protection device as a related art.

To simplify a signal line from these multiple satellite sensors to the ECU, satellite sensors 410, 420, . . . , 4T0 may be connected in a row by a two-line parallel connection bus 3, as shown in FIG. 7 as a related art. In this configuration, each of satellite sensors 410, 420, . . . , 4T0 includes a distributed system interface (DSI). A measurement signal of each of the various sensors is digitized by the DSI, and the ECU receives the measurement signals through the parallel connection bus 3. Furthermore, a squib to ignite an inflator of an airbag or the like is attached to the inflator and a line to provide an ignition voltage to the squib is extended from the ECU. A switch circuit is also included in the ECU to ignite the squib (not shown in FIG. 7).

In the related art in FIG. 7, since a signal line or a signal bus connecting multiple satellite sensors to the ECU is separately arranged from an ignition line connecting the ECU to each of the squib, it is required to individually attach the signal line (or the signal bus) and the ignition line, and a large man-hour is required. By the same reason, it can be expressed that, since more lines are required, the line of the occupant protection device may be more complicated and the occupant protection device may be heavier and larger when the occupant protection device is considered as a system.

Regarding embodiments of the present disclosure, occupant protection devices 1, 1A, . . . , 1E as embodiments according to the present disclosure will be described in the following.

(First Embodiment)

(Configuration of First Embodiment)

Figure 1:
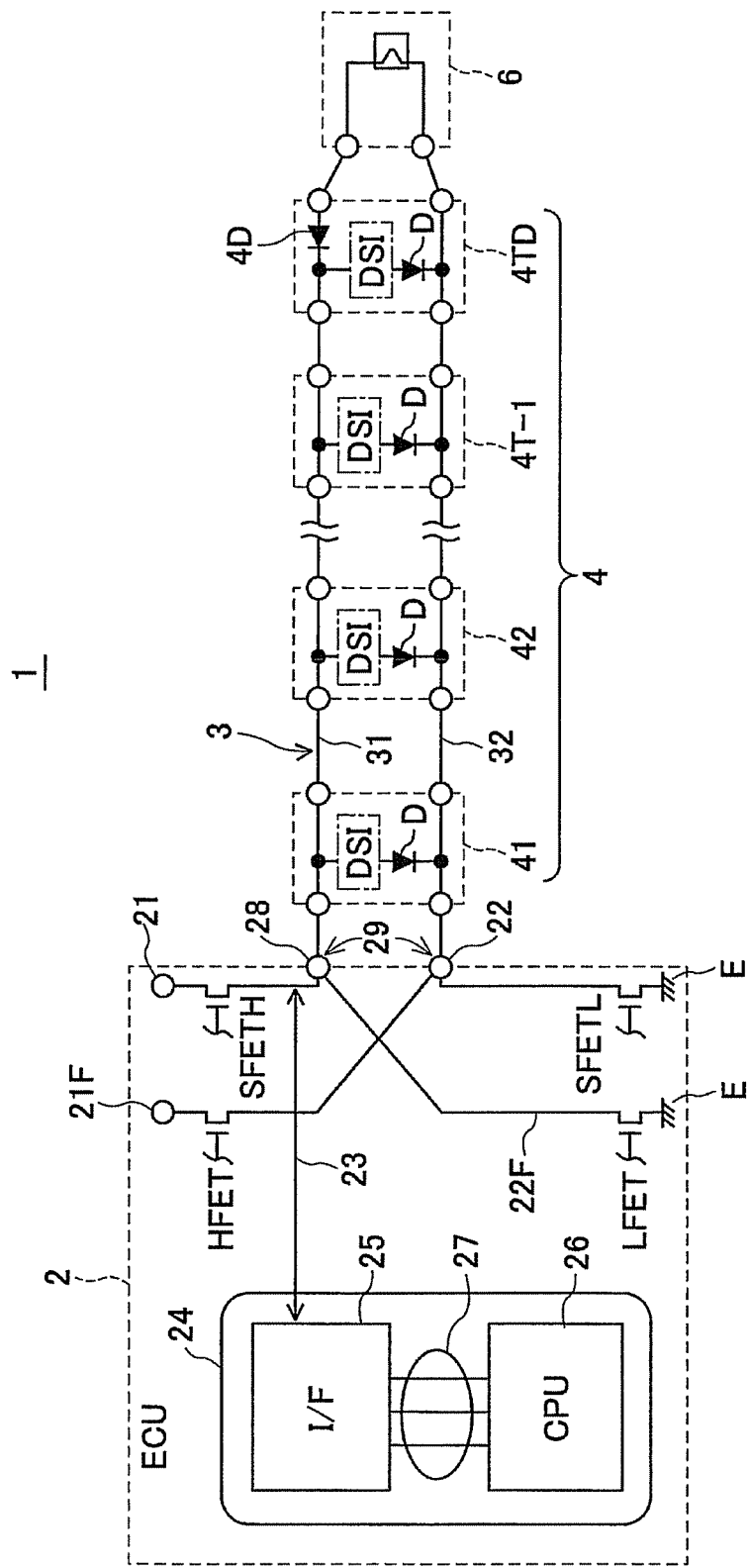
FIG. 1 is a circuit diagram illustrating a structure of an occupant protection device according to a first embodiment.

The occupant protection device 1 according to a first embodiment of the present disclosure, as shown in FIG. 1, is provided with an airbag ECU 2, a two-line parallel connection bus 3 of which a base portion is connected to the ECU 2, multiple satellite sensors 41, 42, . . . , 4T-1, 4TD serially connecting to the parallel connection bus 3, and a squib 6 connecting to the parallel connection bus 3.

A technical feature of the first embodiment may be that the squib 6 connected in series to an accident prevention diode 4D is connected at a termination of the parallel connection bus 3 and that the ECU 2 functions to apply an ignition voltage to the squib 6 in a collision, so that the ignition voltage applied to the squib 6 has a reverse polarity to a sensor drive voltage. That is, in a case where a control board. 24 of the ECU 2 determines that a collision occurs based on a sensor signal obtained through the parallel connection bus 3, four switching elements (described below) included in the ECU 2 are switched and the ignition voltage is applied to the squib 6 through the parallel connection bus 3 from the ECU 2.

Therefore, the base portion of the parallel connection bus 3 is connected to the connection port 29, and the termination of the parallel connection bus 3 is the other side of the parallel connection bus 3 from the base portion.

The ECU 2 includes (i) an interface 25 having a communication circuit for a power line superposed communication and (ii) the control board 24 having a processor (CPU) 26 for a collision determination. A SPI bus 27 connects the interface 25 with the processor 26. Based on a determination result of the control board 24, the ECU 2 starts at least one of occupant protection means, which may include the airbag. Specifically, the ECU 2 applies the ignition voltage to the squib 6 and ignites an inflator including gunpowder to expand an airbag (not shown).

The occupant protection means can correspond to an example of occupant protection portions. A SPI bus denotes a serial peripheral interface bus.

Therefore, the interface 25 in the control board 24 included in the ECU 2 is also used as a power line superposed communication circuit and is connected to a power supply terminal 28 of the parallel connection bus 3 through an internal communication bus 23. The interface 25 receives measurement signals from satellite sensors 41, 42, . . . , 4T-1, 4TD through the parallel connection bus 3. Furthermore, there are four switching elements HFET, LFET, SFETH, SFETL -per two terminals of a connection port 29 on the ECU 2. The four switching elements HFET, LFET, SFETH, SFETL are controlled by the interface 25 and are field effect transistors.

The base portion of the parallel connection bus 3 is connected to the connection port 29 of the ECU 2. During a normal operation except for when a collision occurs, the parallel connection bus 3 is supplied with the sensor drive voltage through the connection port 29 of the ECU 2. In the parallel connection bus 3, multiple satellite sensors 41, 42, . . . , 4T-1, 4TD for collision detection in the satellite sensor array 4 is beaded in parallel.

Each of the satellite sensors 41, 42, . . . , 4T-1, 4TD includes a distributed system interface (DSI) located between the two lines 31, 32 of the parallel connection bus 3. Each of the satellite sensors 41, 42, . . . , 4T-1, 4TD stores various kinds of collision detection sensors (not shown) using the distributed system interface DSI. The satellite sensors 41, 4TD act as a satellite sensor array 4 and detect a lateral collision. For example, each of the satellite sensors 41, . . . , 4TD may be a collision acceleration sensor fixed in an A pillar, a B pillar, or a C pillar of a vehicle (not shown) or may be a pressure sensor which detects a rapid pressure change of the inside space of each door.

The satellite sensors 41, 42, . . . , 4T-1, 4TD have a backflow prevention diode D which is connected to the distributed system interface DSI in series and prevents the ignition voltage from being applied to the distributed system interface DSI. In a case where the backflow prevention diode D is provided, even when the ignition voltage is applied to the satellite sensors 41, 42, . . . , 4T-1, 4TD at a start of an occupant protection means such as the airbag or the like, a current does not flow backward into the distributed system interface DSI included in each of the satellite sensors 41, 42, . . . , 4T-1, 4TD. As a result, even when the airbag or the like operate in a collision, the satellite sensors 41, 42, . . . , 4T-1, 4TD are protected from the ignition voltage. Therefore, both functions of a squib ignition and a satellite sensing are divided by time and assembled into the parallel connection bus 3 including each of the distributed system interfaces DSI.

The squib 6 is connected to the parallel connection bus 3 and ignites the above airbag inflator (not shown) by the ignition voltage, having a reversed polarity to the sensor drive voltage, so as to deploy the airbag. To prevent the sensor drive voltage from accidentally operating the squib 6, an accident prevention diode 4D is located close to the squib 6 and is connected in series to the squib 6 and has a reverse polarity to the sensor drive voltage. Therefore, the satellite sensor 4TD, which is adjacent to the squib 6, includes the accident prevention diode 4D, which is connected in series to a terminal adjacent to the squib 6.

The ECU 2 includes a pair of the ignition switching elements HFET, LFET which apply the ignition voltage to the squib 6 through the parallel connection bus 3 in a collision. Similarly, the ECU 2 includes a pair of the sensor switching elements SFETH, SFETL which supply the parallel connection bus 3 with a sensor drive voltage in a normal operation and which stop applying the sensor drive voltage to the parallel connection bus 3 in a collision.

The ECU 2 has the bus connection port 29 of the parallel connection bus 3 having the power supply terminal 28 and the ground-side terminal 22. The power supply terminal 28 of the ECU is connected to the power supply line 31, which is one of the two lines 31, 32 configuring the parallel connection bus 3, and the ground-side terminal 22 of the ECU 2 is connected to the ground line 32, which is the other of the two lines 31, 32 configuring the parallel connection bus 3. Furthermore, the ECU 2 has also (i) a sensor power supply terminal 21 connecting to a power source (not shown) of the sensor drive voltage, (ii) an ignition power supply terminal 21F connecting to a power source (not shown) of an ignition voltage which has a same polarity to the power source of the sensor drive voltage, and (iii) a ground terminal E.

The ECU 2 has a sensor drive circuit having the sensor switching element SFETH on a power source side and the sensor switching element SFETL on a ground side. The sensor switching element SFETH is located between the sensor power supply terminal 21 and the power supply terminal 28. The switching element SFETL is located between the ground-side terminal 22 and the ground terminal E. The ECU 2 has also a squib ignition circuit including the ignition switching element HFET on an ignition power supply side and the ignition switching element LFET on a ground side. The ignition element HFET is located between the ignition power supply terminal 21F and the ground-side terminal 22. The LFET is located between the power supply terminal 28 and the ground terminal E.

The sensor switching element SFETH can correspond to a power-side sensor switching element, the sensor switching element SFETL can correspond to a ground-side sensor switching element, the ignition switching element HFET can correspond to a power-side ignition switching element, and the ignition switching element LFET can correspond to a ground-side ignition switching element.

The control board 24 of the ECU 2 is switchable between two states based on a result of a collision determination by the processor 26. In a first state, the sensor driver circuit having the sensor switching elements SFETH, SFETL is closed. In a second state, the squib ignition circuit having the ignition switching elements HFET, LFET is closed.

Furthermore, the sensor switching elements SFETH, SFETL are elements having a function which keeps a current equal to or less than 50 mA, which can correspond to an example of a predetermined accident prevention current value. Therefore, even when the accident prevention diode 4D has an initial failure, an unnecessary starting of the occupant protection device, such as an accidental deployment of the airbag or the like, due to a malfunction of the squib 6 can be prevented.

(Technical Effect of First Embodiment)

As described above, the occupant protection device 1 according to the first embodiment of the present disclosure functions as the following.

In a normal operation when a collision is not determined, the sensor switching elements SFETH, SFETL are closed and the sensor drive voltage is applied to the parallel connection bus 3 through the connection port 29. In the situation, by a function of the accidental prevention diode 4D, the sensor drive current will not flow to the squib 6 connecting to the termination of the parallel connection bus 3.

Conversely, in a case where the processor 26 determines that a collision occurs based on signals from the satellite sensors 41, 42, . . . , 4T−1, 4TD, the sensor switching elements SFETH, SFETL are immediately opened and then the ignition switching elements HFET, LFET are immediately closed. Subsequently, from the squib ignition power supply terminal 21F, the ignition voltage is applied to the ground-side terminal 22 of the bus connection port 29 and conversely the power supply terminal 28 of the bus connection port 29 is grounded. The ignition voltage has a reverse polarity to the above sensor drive voltage and higher voltage than the above sensor drive voltage. As a result, by applying the ignition voltage, a relatively large current with high voltage instantly flows through the two lines 31, 32 of the parallel connection bus 3, and the squib 6 starts to operate the occupant protection device, such as the airbag or the like.

Although the ignition voltage with a reverse polarity to the sensor drive voltage is applied to the satellite sensors 41, 42, . . . , 4T−1, 4TD through the parallel connection bus 3, the backflow prevention diode D included in each of the satellite sensors 41, 42, . . . , 4T−1, 4TD protects the distributed system interface (DSI). Since the sensor switching elements SFETH, SFETL have been opened, the power supply (not shown) providing the power with the sensor power supply terminal 21 is separated so that a short circuit will not occur and the power supply (not shown) for the satellite sensors 41, 42, . . . , 4T−1, 4TD is protected.

The occupant protection device 1 according to the first embodiment of the present disclosure has the above reasonable configuration and, in addition to the satellite sensors 41, 42, . . . , 4T−1, 4TD, the squib 6 is also connected to the two-line parallel connection bus 3. Therefore, the parallel connection bus 3 connecting the satellite sensor array 4 with the ECU 2 is also used as an ignition line to the squib 6 and it is not necessary to provide the ignition line separately. Thus, a line of the occupant protection device 1 in the first embodiment can be simplified compared with a case where the ignition line is provided separately. Therefore, according to the occupant protection device 1 in the first embodiment, since a line connecting to the occupant protection means such as the airbag or the like becomes simplified, a production cost required to locate the line is reduced and it enables that the line itself becomes downsized and lightweight.

(First Modification of First Embodiment)

Figure 2:
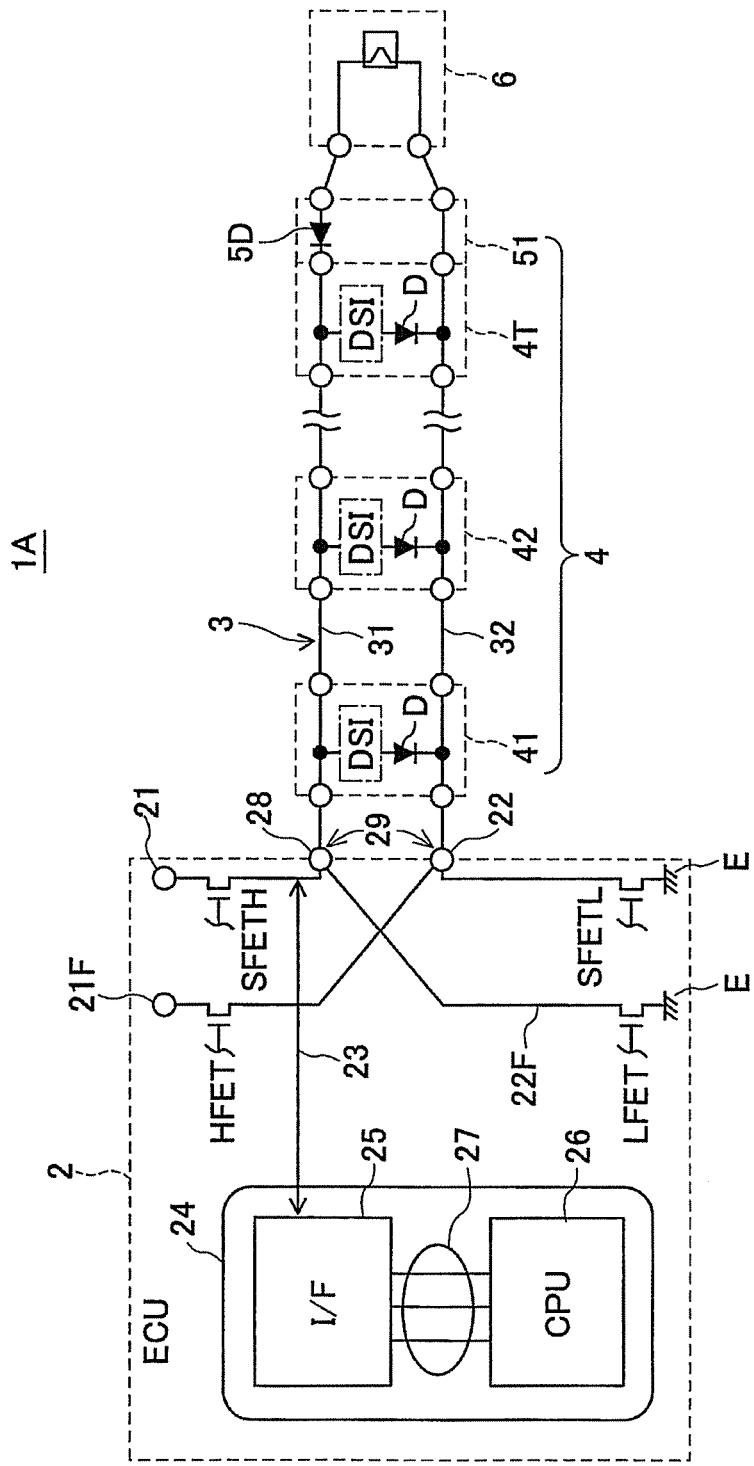
FIG. 2 is a circuit diagram illustrating a structure of the occupant protection device according to a first modification of the first embodiment.

As a first modification of the first embodiment, as shown in FIG. 2, an occupant protection device 1A can be embodied as described below. In the occupant protection device 1A, although the squib 6 is located at the termination of the parallel connection bus 3 similar to the first embodiment, an accident prevention diode 5D is included in an attachment 51 of a satellite sensor 4T, adjacent to the prevention diode 5D. According to the first modification, the attachment 51 connects to a connection port of the satellite sensor 4T adjacent to the squib 6 which is connected to the termination of the parallel connection bus 3 and which does not have, a diode. In the attachment 51, to prevent the sensor drive voltage from being applied to the squib 6, the accident prevention diode 5D is included.

According to the first modification, in addition to obtaining a similar technical effect of the first embodiment, specifications of satellite sensors 41, 42, . . . , 4T connecting to the parallel connection bus 3 can be standardized. As a result, a different satellite sensor with an accident prevention diode, e.g., the satellite sensor 4TD corresponding to a terminal sensor of the satellite sensor array 4 in the first embodiment, does not need to be produced separately and the configuration in the first modification results in cost reduction.

(Second Embodiment)

(Configuration and Technical Effect of Second Embodiment)

Figure 3:
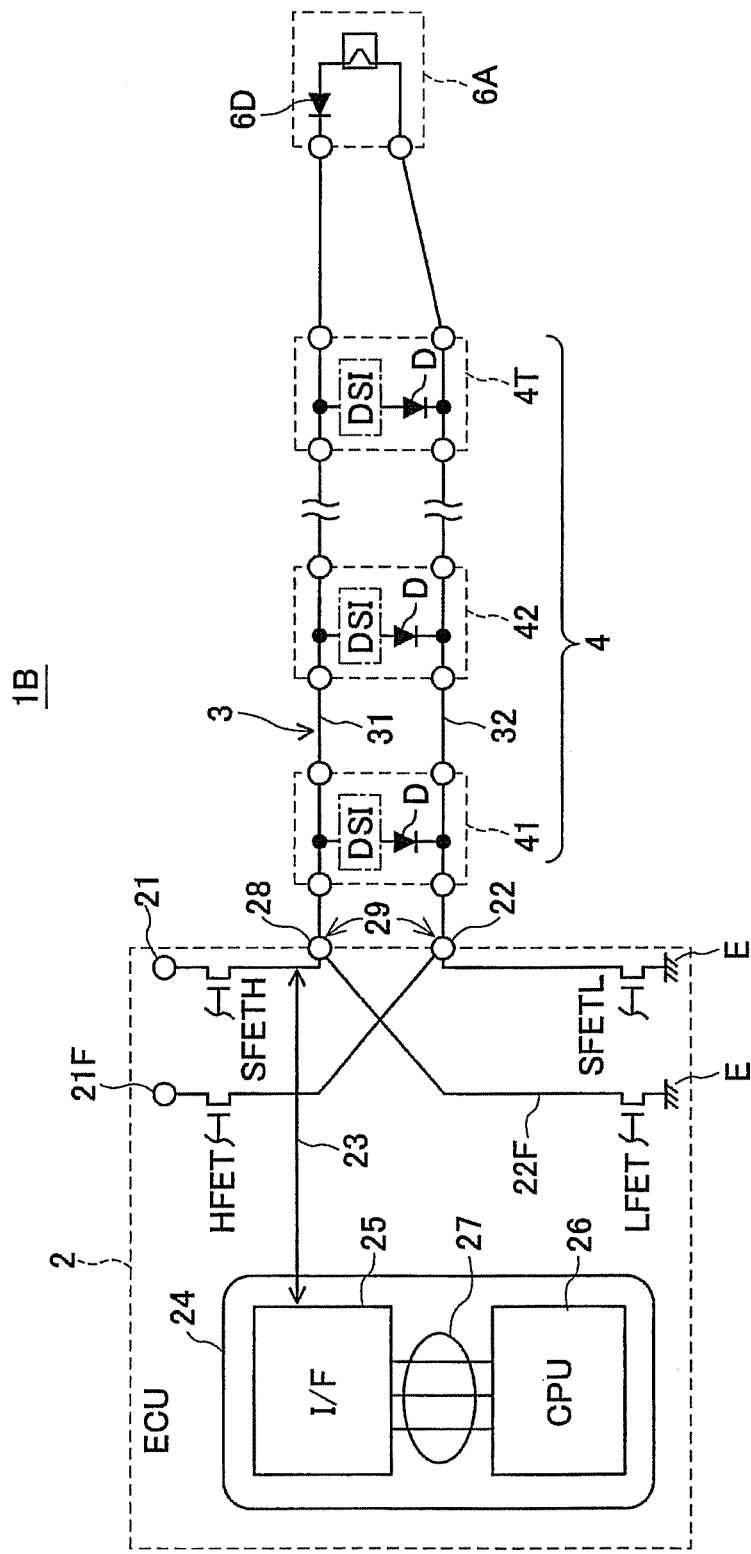
FIG. 3 is a circuit diagram illustrating a structure of the occupant protection device according to a second embodiment.

In the occupant protection device according to a second embodiment of the present disclosure, as shown in FIG. 3, an accident prevention diode 6D is included in a two-terminal squib 6A connecting to the termination of the parallel connection bus 3.

Therefore, it enables that satellite sensors 41, 42, 4T configuring the satellite sensor array 4 have all the same specification. In contrast to the first embodiment, it is not necessary to insert the satellite sensor with an accident prevention diode at the termination of the parallel connection bus 3.

Therefore, according to the first modification of the second embodiment, in addition to obtaining a similar technical effect of the first embodiment, safety against an accidental explosion may be improved such when a satellite sensor is added by a design change.

(First Modification of Second Embodiment)

Figure 4:
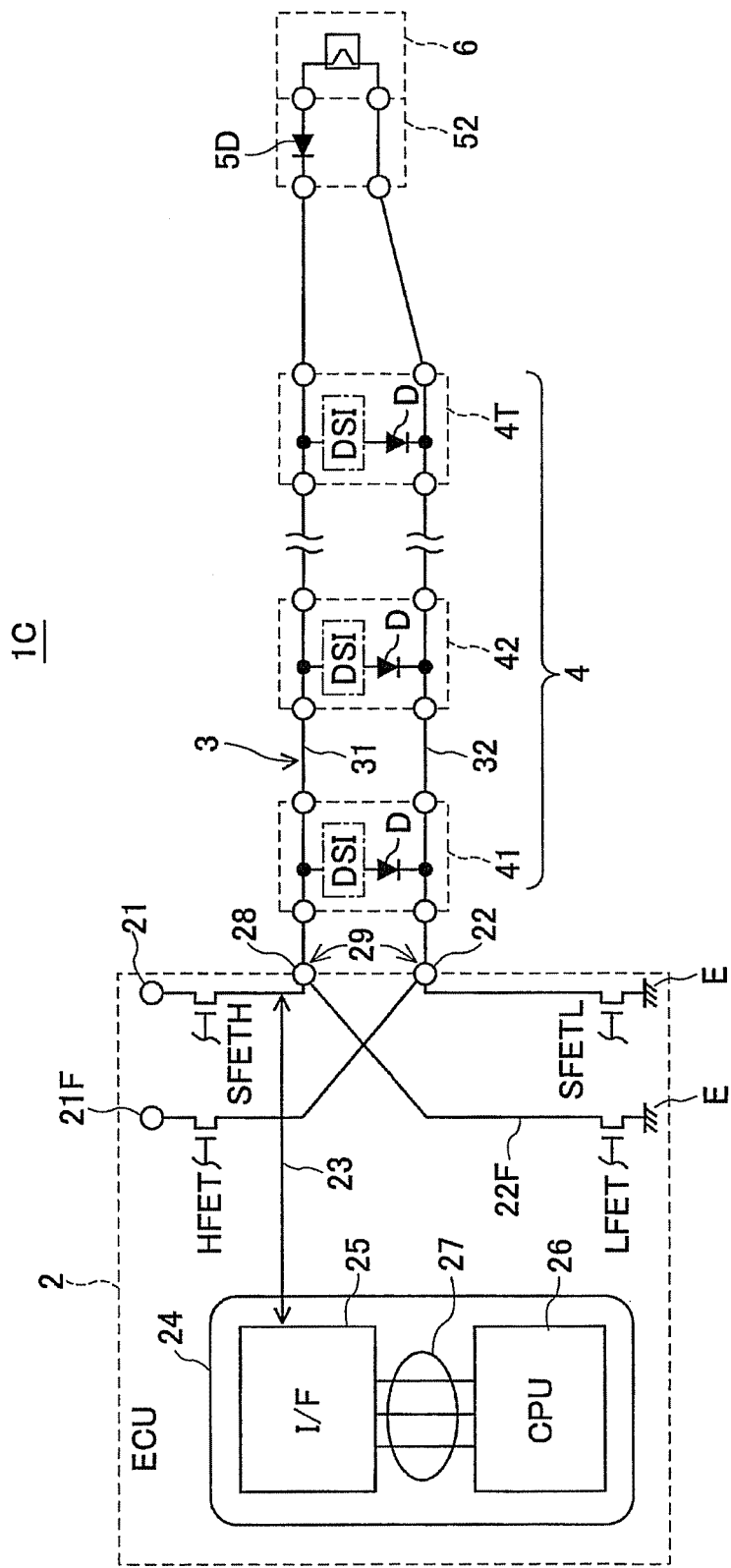
FIG. 4 is a circuit diagram illustrating a structure of the occupant protection device according to a first modification of the second embodiment

As a first modification of the second embodiment, as shown in FIG. 4, an occupant protection device 1C having an attachment 52 may be configured. The attachment 52 includes an accident prevention diode 5D connecting to a connection port of the squib 6.

In the first modification of the second embodiment, it is sufficient to confirm an addition of the attachment 52 and it is not, necessary to confirm an inclusion of an accident prevention diode to the squib 6. Therefore, according to the first modification of the second embodiment, in addition to obtaining a similar technical effect of the second embodiment, safety against an accidental explosion may be improved.

(Third Embodiment)
(Configuration and Technical Effect of Third Embodiment)

Figure 5:
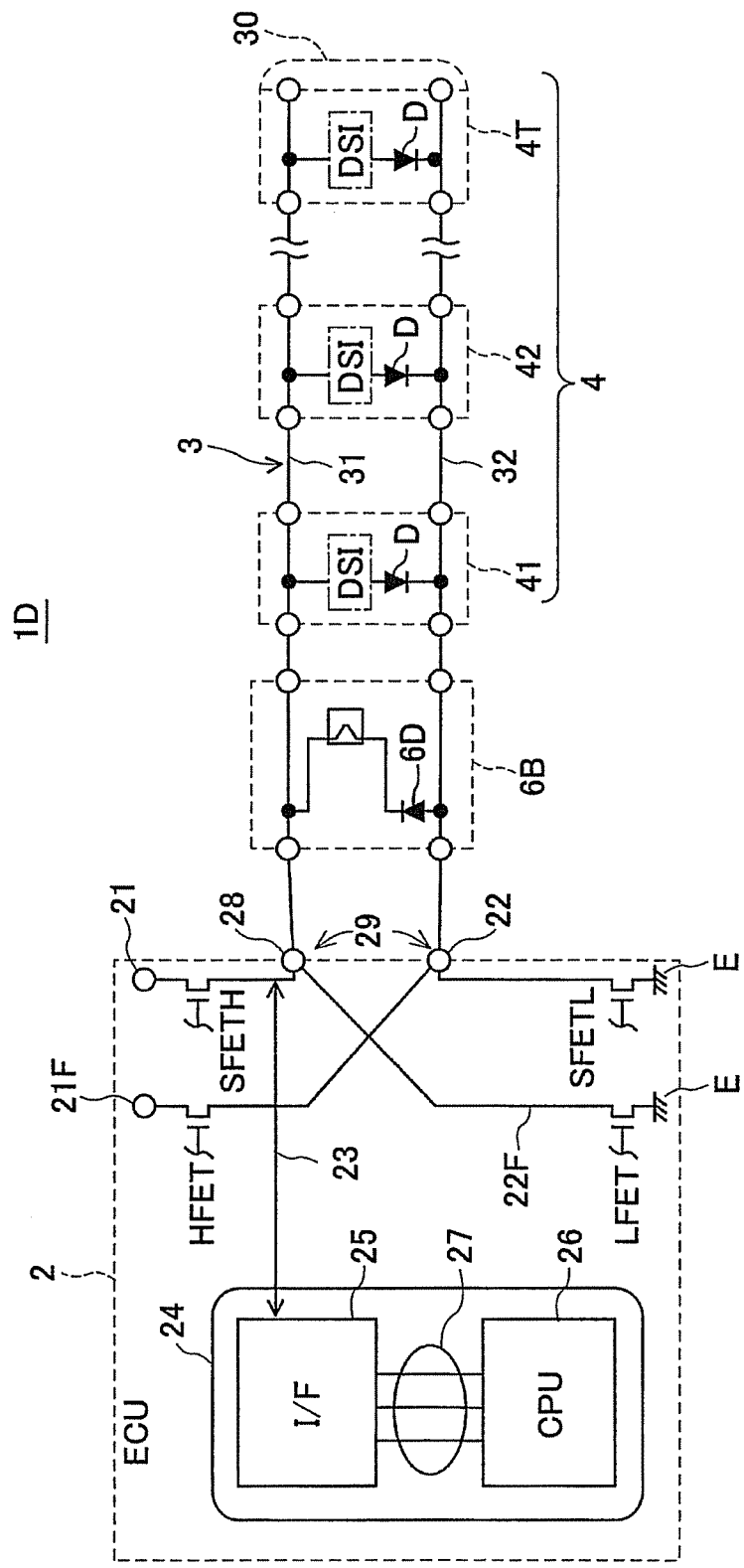
FIG. 5 is a circuit diagram illustrating a structure of the occupant protection device according to a third embodiment.

An occupant protection device 1D according to a third embodiment of the present disclosure, as shown in FIG. 5, includes a four-terminal squib 6B which is connectable at the middle of the parallel connection bus 3. The four-terminal squib 6B includes an accident prevention diode 6D. The squib 6B is inserted into the base portion of the parallel connection bus 3 and is connected in the vicinity of the connection port 29 of the ECU 2. According to the third embodiment, only a portion between the ECU 2 and the squib 6B in the two lines 31, 32 of the parallel connection bus 3 may be resistant to large current.

According to the third embodiment, even if large current flows to the squib 6B by the ignition voltage in a collision, the large current will not flow to the satellite sensor array 4 beyond the squib 6B so that the satellite sensor array 4 is protected from the large current. Therefore according to the third embodiment, in addition to the technical effects of the above first and second embodiments, the squib 6B can be connected in the vicinity of the ECU 2 and the parallel connection bus 3 including the satellite sensors 41, 42, 4T can be protected from large current.

An open end of the satellite sensor 4T located in the termination of the parallel connection bus 3 is covered by a cap 30 so that the occupant protection device 1D is protected from an unexpected electromotive force, such as static electricity or the like.

(Various Modifications of Third Embodiment)

Since the squib 6B used in the third embodiment has four terminals, it enables that the squib 6B is inserted into any position in the parallel connection bus 3. Therefore, flexibility with regard to a connection position of the squib 6B to the satellite sensor array 4 in the parallel connection bus 3 increases. The flexibility is shown when the occupant protection device 1D is mounted on a vehicle or the like.

When the four-terminal squib 6B is connected to the termination of the parallel connection bus 3, it may be preferable that an open end of the squib 6 be protected from static electricity by covering with the cap 30.

(Fourth Embodiment)
(Configuration and Technical Effect of Fourth Embodiment)

Figure 6:
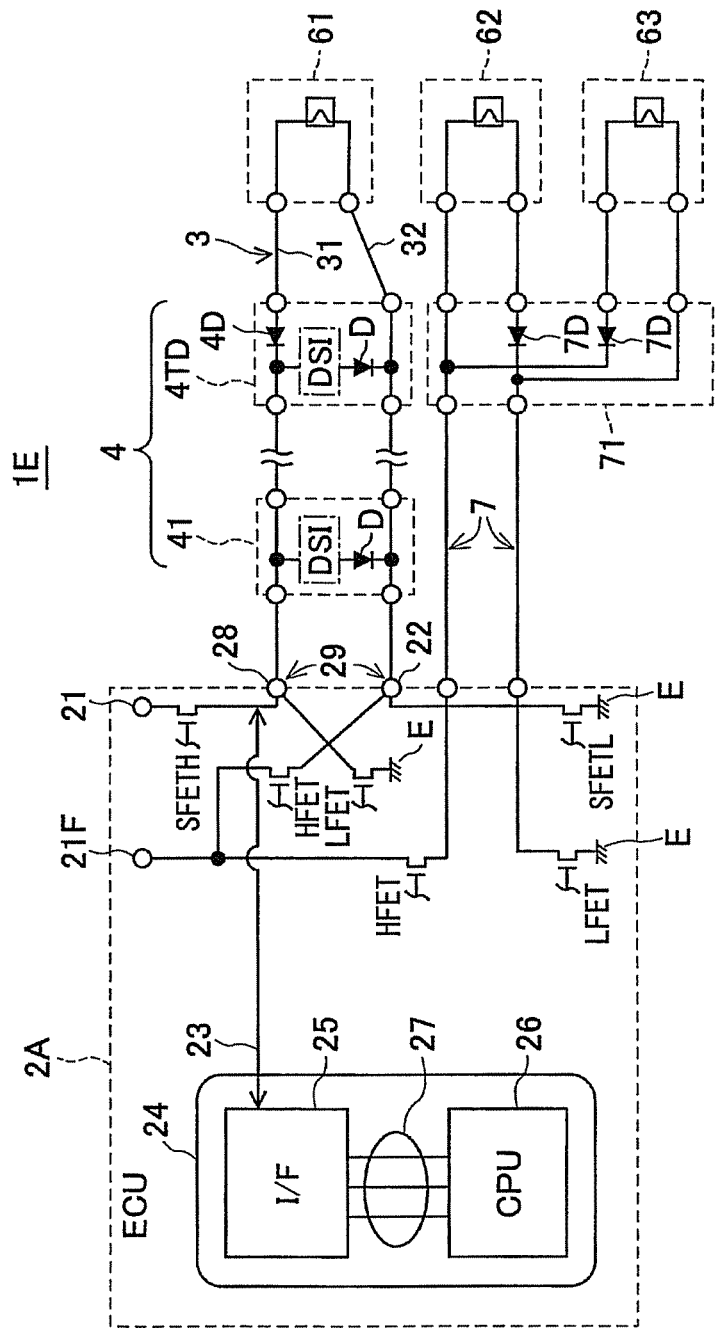
FIG. 6 is a circuit diagram illustrating a structure of the occupant protection device according to a fourth embodiment.

In an occupant protection device 1E according to a fourth embodiment of the present disclosure, as shown in FIG. 6, in addition to a similar configuration with the first embodiment, the occupant protection device 1E has multiple squibs 62, 63 to which are applied the ignition voltage through an ignition line 7 from an ECU 2A. The multiple squibs 62, 63 are provided apart from a squib 61 connected to the parallel connection bus 3. A branch container 71 includes an accident prevention diode 7D for each of the squibs 62, 63 and is attached to the squibs 62, 63. Dedicated switching elements HFET, LFET which supply the ignition voltage with the ignition line 7 are added in the ECU 2A. The dedicated switching elements HFET. LFET are also controlled by the control board 24 like the switching elements HFET, LFET connecting to the parallel connection bus 3. In a case where a collision is determined, the squibs 62, 63 are ignited in the same way as the squib 61 located in the termination of the parallel connection bus 3 is ignited. In this regard, however, depending on kinds and arrangement of the occupant protection device means, the squib 61 and the squibs 62, 63 may be ignited with an appropriate time difference.

According to the occupant protection device 1E of the fourth embodiment, in addition to a technical effect of the first embodiment, it enables that the more occupant protection means are started and that the various occupant protection means are started with a time difference.

(Various Modification of Fourth Embodiment)

In a configuration of the fourth embodiment, the configuration of the parallel connection bus 3 can be modified corresponding to the first modification of the first embodiment, the second embodiment, the third embodiment, the fourth embodiment and/or the various modifications of each of the embodiments. The number of the squibs 62, 63 connecting to the ignition line 7 can be increased or decreased and the number of the ignition line 7 and the dedicated switching elements HFET, LFET can be increased, so that the ignition line 7 can start many and various kinds of occupant protection devices.

According to the present disclosure, an occupant protection device can be provided in various forms, examples of which will be described. In the below, a reference symbol given to each member indicates an example of correspondence relation with a reference symbol described in each of the embodiments and modifications of the embodiments.

According to one example, occupant protection devices 1, 1A, . . . , 1E include (i) electronic control units (ECUs) 2, 2A, (ii) a parallel connection bus 3 having two lines 31, 32, and (iii) multiple satellite sensors connected to the parallel connection bus 3.

Furthermore, the ECUs 2, 2A include a control board 24 which has an interface 25 having a communication circuit to conduct a power line superposed communication, and a processor 26 connected to the interface 25 and determining a collision. The ECUs 2, 2A start to operate at least one of occupant protection means such as the airbag, based on a result of a determination by the control board 24. The parallel connection bus 3 is connected to the electronic control units 2, 2A at a base portion of the parallel connection bus 3. The parallel connection bus 3 is supplied with a sensor drive voltage from the ECUs 2, 2A. The parallel connection bus 3 is connected to multiple satellite sensors 41, 42, 4T, 4T-1, 4TD. Each of the satellite sensors 41, 42, 4T, 4T-1, 4TD is located between two lines 31, 32 of the parallel connection bus 3 and includes a distributed system interface (DSI).

Features of the present disclosure is that the squibs 6, 6A, 6B, 61, which is connected in series to the accident prevention diodes 4D, 5D, 6D, is connected to the parallel connection bus (3) and that the ECUs 2, 2A apply an ignition voltage, which is reverse polarity to the sensor drive voltage, to the squibs 6, 6A, 6B, 61.

Therefore, the squibs 6, 6A, 6B, 61 are connected to the parallel connection bus 3 and cause the occupant protection means to operate by an ignition voltage being reverse polarity to the sensor drive voltage. To prevent the sensor drive voltage from accidentally operating the squibs 6, 6A, 6B, 61, the accident prevention diodes 4D, 5D, 6D are located close to the squibs 6, 6A, 6B, 61 and connected in series to the squibs 6, 6A, 6B, 61, having a reverse polarity to the sensor drive voltage. The ECUs 2, 2A includes ignition switching elements HFET, LFET which apply the ignition voltage for the squibs 6, 6A, 6B, 61 through the parallel connection bus 3.

In the present embodiment, although terms such as the squibs 6, 6A, 6B, 61 and the ignition voltage are used in the assumption that an inflator of an airbag is ignited, this is merely because many kinds of airbags are developed as occupant protection means and usage of such terms helps to understand the disclosure.

Therefore, the squibs 6, 6A, 6B, 61 according to the present disclosure are not necessary limited to an inflator of an airbag and may denote a device which starts to operate any occupant protection device. As an occupant protection device except for the airbag, for example, a pretensioner of a seatbelt may be exemplified. Similarly, the ignition voltage which an ECU applies to a squib may be voltage, current, electric power and electrical signal which cause any occupant protection device to start.

Furthermore, in order to protect a circuit of the ECUs 2, 2A, a switching circuit including which four elements per two terminals, i.e. two elements per one terminal, inside the ECUs 2, 2A may be configured and the switching elements is controlled by the control board 24 appropriately with time sharing. Therefore, the control board 24 is configured to switch between two states based on the collision determination. In a first state, a sensor drive circuit including a pair of the sensor switching elements SFETH, SFETL is closed so as to apply a sensor drive voltage to the parallel connection bus 3. In a second state, an ignition circuit including a pair of the ignition switching elements HFET, LFET is closed so as to apply an ignition voltage to the parallel connection bus 3. From other point of view, since the parallel connection bus has two lines, in the parallel connection bus 3 with two terminals, one terminal of the parallel connection bus 3 is assigned to an "H" side meaning a high potential side and the other is assigned to an "L" side meaning a low potential side. In other words, a pair of switching circuit including the sensor drive circuit and the squib ignition circuit is provided in the ECUs 2, 2A.

While the present disclosure has been described with reference to embodiments thereof, it is .to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An occupant protection device comprising:
    an electronic control unit including a control board, the control board including
        an interface having a communication circuit to conduct a power line superposed communication, and
        a processor connected to the interface and configured to make a collision determination;
    a parallel connection bus having two lines, wherein a base portion of the parallel connection bus is connected to the electronic control unit, wherein the parallel connection bus is supplied with a sensor drive voltage;
    a plurality of satellite sensors connected to the parallel connection bus for collision detection, wherein each of the satellite sensors includes a distributed system interface which is located between the two lines;
    a squib connected to the parallel connection bus and configured to start to operate at least one of occupant protection portions by an ignition voltage which is reverse polarity to the sensor drive voltage; and
    an accident prevention diode located in vicinity of the squib and connected in series with the reverse polarity to the sensor drive voltage, wherein
    the electronic control unit starts to operate at least one of the occupant protection portions based on a result of the collision determination by the control board, and
    the electronic control unit includes an ignition switching element which applies the ignition voltage for the squib through the parallel connection bus.

2. The occupant protection device according to claim 1, wherein
    each of the satellite sensors has a backflow prevention diode which is connected in series to the distributed system interface and prevents application of the ignition voltage to the distributed system interface.

3. The occupant protection device according to claim 1, wherein:
    one of the two lines of the parallel connection bus is a power supply line;
    the other of the two lines of the parallel connection bus is a ground line;
    the electronic control unit includes
        a power supply terminal connected to the power supply line,
        a ground-side terminal connected to the ground line,
        a sensor power supply terminal connected to a power supply of the sensor drive voltage,
        an ignition power supply terminal connected to a power supply of the ignition voltage having a same polarity to the sensor drive voltage, and
        at least one ground terminal;
    the electronic control unit further includes
        a power-side sensor switching element interposed between the sensor power supply terminal and the power supply terminal,
        a ground-side sensor switching element interposed between the ground-side terminal and the ground terminal;
        a power-side ignition switching element interposed between the ignition power supply terminal and the ground-side terminal; and
        a ground-side ignition switching element interposed between the power supply terminal and the ground terminal; and
    based on the result of the collision determination, the control board switches between
        a first state, where a sensor drive circuit including the power-side sensor switching element and the ground-side sensor switching element is closed, and
        a second state, where an ignition circuit including the power-side ignition switching element and the ground-side ignition switching element is closed.

4. The occupant protection device according to claim 1, wherein:
    the parallel connection bus includes the squib at a termination of the parallel connection bus;
    a first satellite sensor of the satellite sensors is adjacent to the squib; and
    the first satellite sensor includes an accident prevention diode which is connected in a row to a terminal of the first satellite sensor, the terminal of the first satellite sensor being adjacent to the squib.

5. The occupant protection device according to claim 1, wherein:
    the squib includes the accident prevention diode; and
    the squib is either
        a two-terminal squib which is connected to the termination of the parallel connection bus, or
        a four-terminal squib which is connectable at a middle of the parallel connection bus or the termination of the parallel connection bus.

6. The occupant protection device according to claim 1, wherein:
    the parallel connection bus has
        the squib connected at the termination of the parallel connection bus, and
        an attachment including the accident prevention diode and being connected to either
            a connection port of the squib, or
            a connection port of a second satellite sensor of the satellite sensors, the second satellite sensor being adjacently connected to the squib.

7. The occupant protection device according to claim 1, wherein
   at least one of the power-side sensor switching element or the ground-side sensor switching element keeps a current flowing through the parallel connection bus less than or equal to a predetermined accident prevention current value.

8. The occupant protection device according to claim 1, wherein
   apart from the squib connected to the parallel connection bus, the occupant protection device has at least one of squibs to which the ignition voltage is applied from the electronic control unit.

\* \* \* \* \*